(12) United States Patent
Krippene

(10) Patent No.: US 7,488,150 B2
(45) Date of Patent: Feb. 10, 2009

(54) VERTICAL WIND TURBINE SYSTEM WITH ADJUSTABLE INLET AIR SCOOP AND EXIT DRAG CURTAIN

(76) Inventor: Brett C. Krippene, P.O. Box 69, Rimrock, AZ (US) 86335-0069

( * ) Notice: Subject to any disclaimer, the term of this patent is extended or adjusted under 35 U.S.C. 154(b) by 236 days.

(21) Appl. No.: 11/608,658

(22) Filed: Dec. 8, 2006

(65) Prior Publication Data

US 2007/0231118 A1    Oct. 4, 2007

Related U.S. Application Data

(60) Provisional application No. 60/766,003, filed on Dec. 29, 2005.

(51) Int. Cl.
    *F03D 3/04* (2006.01)
(52) U.S. Cl. .......... 415/4.2; 415/4.3; 415/4.4; 415/4.5; 415/127; 415/211.2; 416/132 A; 416/132 B; 416/244 R
(58) Field of Classification Search ........... 415/4.2, 415/4.4, 126, 127, 907; 416/132 A, 132 B; 290/44, 55
    See application file for complete search history.

(56) References Cited

U.S. PATENT DOCUMENTS

| | | | | |
|---|---|---|---|---|
| 993,120 | A | * | 5/1911 | Sterner ............... 415/4.4 |
| 1,169,223 | A | * | 1/1916 | Abern ............... 415/4.4 |
| 4,017,204 | A | * | 4/1977 | Sellman ............. 415/4.4 |
| 4,017,205 | A | | 4/1977 | Bolie |
| 4,116,581 | A | * | 9/1978 | Bolie ................. 415/4.4 |
| 4,309,146 | A | | 1/1982 | Hein et al. |
| 4,365,929 | A | | 12/1982 | Retz |
| 4,398,096 | A | * | 8/1983 | Faurholtz ........... 290/55 |
| 4,516,907 | A | * | 5/1985 | Edwards ............ 415/4.5 |
| 4,963,761 | A | | 10/1990 | Wight |
| 5,836,738 | A | | 11/1998 | Finney |
| 5,990,568 | A | * | 11/1999 | Hildingsson et al. ..... 290/55 |
| 6,952,058 | B2 | * | 10/2005 | McCoin ............. 290/44 |
| 6,962,478 | B2 | | 11/2005 | Tsipov |
| 6,984,899 | B1 | * | 1/2006 | Rice .................. 290/44 |

FOREIGN PATENT DOCUMENTS

EP    0003185    7/1979

* cited by examiner

*Primary Examiner*—Ninh H Nguyen (57) ABSTRACT

A wind driven vertical axis power generating system is disclosed. An air scoop directs air from the prevailing wind into an air turbine. An exit drag curtain provides for an efficient re-entrainment of the power generating air back into the prevailing wind. The design provides for an efficient method of utilizing the energy from a prevailing wind. The air scoop and exit drag curtain may be rotated to be suitably oriented to the prevailing wind direction. The invention is visually pleasing in shape, as well as efficient in the production of useful power.

19 Claims, 9 Drawing Sheets

VERTICAL WIND TURBINE SYSTEM WITH ADJUSTABLE INLET AIR SCOOP AND EXIT DRAG CURTAIN

CROSS REFERENCE TO RELATED APPLICATIONS

This application claims the benefit of U.S. Provisional Application No. 60/766,003 filed on Dec. 29, 2005. The entire provisional application is incorporated by reference herein. The later filed application supersedes the previously filed application for any changes or conflicting information.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward wind driven power generating systems, and in particular, wind driven power generating systems useful for the production of power, such as electricity, in an efficient and practical manner by use of an air scoop inlet and a wind shielded air exit.

(2) Description of Related Art

There have been a number of patent applications and issued patents which are related to wind power generating systems. The most common commercial methods to date have been turbines with blades that are directly driven by the wind without a collector or wind concentrator. Horizontal axis (i.e. axis of rotation is horizontal) turbines are probably the most common with vertical axis systems also significant. These systems are simple, reasonably efficient, and commercially successful.

Wind power has surprisingly good economics and is capable of producing electricity at cost structure significantly less than 10 cents per kWh, commonly at 5-6 cents per kWh. Economics are constantly being studied and compared to existing methods of producing power which may be approximately 4 cents per kWh for large customers. This alternative energy production method has also been encouraged by tax incentives. There is now an expectation that increasing amounts of electricity will be generated by wind power, as well as other alternative energy based technologies, each year.

Unfortunately, existing wind turbine designs have not been as widely adapted as is economically feasible. There are unforeseen problems with public reaction to the unsightly nature of the turbines and their visual dominance on a landscape. There have been other issues. Existing wind turbines are often high off the ground which increases maintenance costs due to poor accessibility. Some turbines have to reduce their operating speed due to birds colliding with the turbine blades. There are infrastructure problems where high voltage transmission lines are unavailable in favorable wind areas.

An example of a vertical axis turbine is described in U.S. Pat. No. 4,017,205 where a vertical turbine is integrated into a dome structure and the prevailing wind from any direction is meant to create an updraft. The goal is to create an upward force through a turbine which is useful for any wind direction. However, the practicality of the design is highly questionable. The air is not uniformly and forcibly directed through the generating turbine in a highly efficient and effective manner with re-entrainment of the turbine exhaust air back into the wind poorly thought out, and the lower directing surface would allow the turbine inlet air to easily flow around it horizontally without moving vertically.

Another example of the use of vertical axis turbine is U.S. Pat. No. 4,309,146 where a vertical turbine is meant to be driven by a vertical airflow from a horizontal wind which is directed upwardly by use of curved blades. An upper venturi creates a draft for the vertical air stream. The practical aspects of the design are highly limited. There is relatively little surface area where the wind is 'caught' and directed upwardly compared to the surface area of the power generating blades. The upper venturi, as illustrated, is poorly thought out from a flow re-entrainment and throughput standpoint as a large volume of horizontal wind is required to move a relatively smaller amount of vertical air. And as described in the previous paragraph, the vertical flow of air is not forced upwardly through the inner chamber. The draft is generated more from the venturi effect which is known to be a weaker force. The airflow is likely to move around the blades than attempt to direct the airflow vertically.

Similar to the previously described patents, U.S. Pat. No. 4,365,929 discloses a vertical axis turbine that uses a building to 'catch' the wind and direct it vertically upward into the turbine. Various blades are installed on the building surface in a design attempt to force the air to flow upwardly into the turbine. The venturi design does not consider appropriate methods to re-entrain the turbine exhaust air back into the prevailing wind in an efficient manner and the design is overly complicated. Additionally, as stated for previous patents, the air is not forcibly directed through the generating turbine and the lower directing surface would allow the air to easily flow around it horizontally without moving vertically. As illustrated, the amount of surface area that is engaged with the prevailing wind compared to the complexity of the overall system is small. Also, the efficiency of the wind 'catch' and wind 'discharge' has not been carefully planned. Further, the building is a fixed size and it is difficult to optimize the whole design when the wind 'catch' area is a constant size. Varying wind speeds require different surface 'catch' areas for efficient operation. It is less appealing to have the air intake close to the ground as the wind speed is lower.

U.S. Pat. No. 6,962,478 shows a vertical axis windmill that uses a unique outer wall with specially designed moving baffles to create a force on one side of the vertical rotating axis to cause rotation. However, the design of the air stream through the central opening of the framework and the closed baffles is inadequate. The surface area of the outer baffles far surpasses the ability of the framework to vent any air directed inside the framework.

U.S. Pat. No. 4,963,761 discloses a vertical axis fan turbine utilizing the prevailing wind to draw air upwardly through the turbine by a Bernoulli effect. As stated previously, a relatively large volume of air is needed to create the vacuum needed to draw a significant amount of air vertically, and the effect is not as efficient as other methods.

Finally, EP0003185 teaches the use of a large flexible canopy over a land area, such as a canyon, to create air movement through an air turbine. This design is not configured to catch a prevailing wind from any direction, and the simple structure is liable to damage in a high wind. The overly large design is meant to catch the movement of air from a thermal effect when the air is heated by the sun.

BRIEF SUMMARY OF THE INVENTION

Therefore, it is the intention of this invention to overcome the difficulties, problems, obstacles, visual distaste, and poor economics of previous designs. A wind power generating system which utilizes a vertical axis centrifugal fan type turbine with an air scoop inlet, a downward air flow feed tube located above the turbine, and a radial outward air flow turbine exhaust type design that discharges the air back into the wind in the downwind direction is described that allows for efficient movement of air through the fan type turbine.

DETAILED DESCRIPTION OF THE INVENTION

The present invention is a system designed to produce electricity at cost effective rates in an environmentally friendly manner at power outputs approximately 0.10 to 50 kW. It is especially useful in areas where the wind velocity and turbulence increases in places that occur around small hills and tall buildings. It may be employed successfully in the heavily populated downtown sections of major cities. Multiple units can be utilized and may be sized for any given location as the opportunity may arise. Generally speaking, areas with average wind speeds of at least 12 mph are considered to be the most favorable locations for wind power.

Figure 1A:
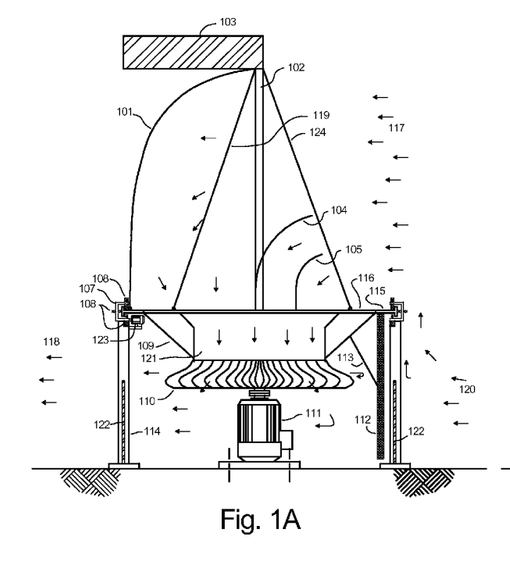
FIGS. 1A-1B shows a preferred embodiment general arrangement of the invention.
Figure 1B:
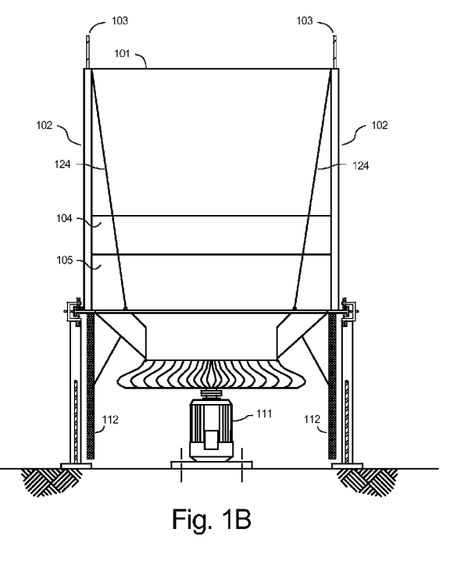

FIGS. 1A-1B show two cross sectional views of a preferred embodiment, general arrangement of the invention. A large air scoop 101 made from a flexible material, such as used in the sailing industry, is hoisted above a vertical axis power generating turbine 110, 111 in order to utilize the upper prevailing wind 117 and direct the maximum air flow possible at maximum available velocity head pressure downward and through the integrated flow tube and power generating turbine assembly. The air scoop 101 is held in place by two masts 102 which are stabilized with suitable guy wires 119, 124 and are mounted on a circular rotating T-rail 115 and support cage assembly 116. A directing air flow tube 121 directs the incoming air flow and air pressure uniformly and downwardly into the turbine rotor assembly 110. The air from the flow tube 121 is routed most appropriately in a more or less radial direction from the inside to the outside edge of the reverse fan type turbine rotor assembly 110 which is connected to the power generator 111. The flow tube 121 is connected to the circular rotating T-rail 115 and support cage assembly 116 and both are held and stabilized in position relative to each other by three or more sector type support plates and struts 109. Additionally, and optionally, directing frontal air scoops 104, 105 are added to provide a more even air flow and pressure distribution into the flow tube 121. The air scoop 101 is positioned to most optimally face the prevailing wind by the moment arm created between the center of the rotating air scoop assembly and the prevailing wind's force upon two stabilizing vanes 103 which are fixed to the two masts. The stabilizing vanes 103 will most naturally be positioned by this self correcting moment arm parallel to the direction of the prevailing wind. The stabilizing vanes also move the circular rotating T-rail 115 and support cage assembly 116 so that the air scoop 101 continuously faces directly into any useful amount of wind in an optimal manner. A small stand-off type support strut 124, projecting directly upwind from each of the two masts in parallel, extends the leading edge of the air scoop at the elevation of the T-rail and support cage assembly to the up-wind edge of the air tube assembly to increase the wind capturing effectiveness and efficiency of the air scoop.

A suitable design, as conceived in this invention, for the rotating T-rail 115 and support cage assembly 116 is a circular, 360° horizontal T or I beam ring type structure 115 which rotates within a vertical channel beam ring type structure 107 by means of the three or more rubber wheel type support assemblies 108. The rotating t-rail 115 and support cage assembly 116 also supports the air scoop, the flow tube and the exit drag curtain sections 112 of the vertical wind turbine assembly 110. The rotating t-rail also maintains their relative positions and alignments with respect to the incoming prevailing wind 117 and the vertical wind turbine assembly 110, 111 respectively. The floor of the support cage assembly 116 surrounding the flow tube inlet consists of a heavy duty hurricane fence type wire mesh type material that is designed for light foot traffic only. The wire mesh floor is in turn covered with a flexible material similar to that used on the air scoop 101 and exit drag curtain 112 assemblies to help direct the collected wind's air flow downwardly into the flow tube assembly. As an option, the inlet portion of the flow tube 121 may also be covered over with the same heavy duty hurricane fence type material used for the floor of the support cage type structure for safety considerations, if appropriate, but is not covered over with the flexible material. The inlet to the flow tube can be provided with a diverging type conical or bell mouthed inlet to reduce the pressure losses slightly at the plane of the inlet to the flow tube.

The circular rotating t-rail 115 and support cage assembly 116 is held in place, yet is free to rotate horizontally by three or more stationary supporting structures, each of which is located more or less equally spaced around the outer periphery of the T-rail and support cage assembly and is detailed as follows. Multiple support posts 114 are firmly anchored to the ground and attached to the 360°, circular and stationary, half box channel support beam 107 with the three hardened rubber wheels 108 mounted at three or more equal spaced intervals around the stationary channel beam support structure. The t-rail 115 is contained by the three wheels 108 to only allow rotation of the circular rotating t-rail and support cage assembly in a horizontal plane 116. An optional jogging motor 123 may be employed on one wheel, if necessary, to most optimally orient the air scoop based on wind direction sensors which are incorporated as part of the one or more stabilizing vane 103 assemblies.

To prevent the lower prevailing wind 120 from adding back pressure to the turbine blades 110 and lowering overall efficiency, an exit drag curtain 112 or blocking plate is attached to the circular mounting t-rail and support cage assembly. The exit drag curtain may be of a flexible sail cloth type material, similar to that used for the inlet air scoop and suitably stiffened or backed up by a lattice work or ribbing, such as heavy duty hurricane fencing. The exit drag curtain 112 protects the area under the circular mounting t-rail and support cage assembly from the lower prevailing wind 120 for approximately 180° in circumference on the up-wind side. Stiffening gussets or struts 113 are used to provide additional stiffness to the exit drag curtain assembly 112 to both hold the desired shape of the exit drag curtain against the force of the prevailing wind and to prevent wind damage. The primary purpose of the exit drag curtain 112 is to prevent back pressure on the turbine blades and allow the turbine exhaust air to re-entrain with the downstream prevailing wind 118 in an efficient and slightly negative pressure manner.

In FIG. 1A, the air caught by the flexible air scoop 101 plus the inherent vacuum generating characteristics of the 180° circumference exit drag curtain 112 design create the total motive force for the preferred embodiment. Variations to this preferred design are discussed in other figures, and provide for additional enhanced power generation capabilities. These wind turbine power enhancements are a result of the various amounts of vacuum exit pressures that can be created within the discharge space created by the exit drag curtain, and at the exit of the power turbine. The amount of negative pressure depends both on the physical construction of the air scoop and the shape of the exit drag curtain upstream of the turbine discharge plane, as well as the relative velocities realized throughout the invention. A larger air volume caught by the air scoop compared to the air flow through the turbine, along with an optimally designed exit drag curtain, creates an overall favorable differential pressure across the turbine, and a higher power output.

For protection and security of the overall system, an optional hurricane fence type enclosure 122 may be employed at ground level and incorporated into the support posts 114 in a manner that allows for free air flow.

FIGS. 1A and 1B do not show any details of the turbine blade design. The type of blade and number of blades is based on an engineering design that provides high efficiency for any given size and for the projected and prevailing wind conditions available for each site. However, at least one elongated blade that rotates about its center is necessary, and preferably there is a plurality of blades. The blade design must be highly efficient at extracting power from the air flow, such as commonly seen in various fan blade and turbine blade designs. A detail of the seal between the flow tube and turbine blades is not shown. However, the seal should be flexible and allow the blades to rotate in a safe and reliable manner without any significant loss of power resulting from air leakage around the turbine. It may be possible to align the equipment to a close tolerance with minimal clearance so a seal is not necessary. Any seal should also provide a reasonable service life. The electrical generator system may be directly connected to the turbine blades, or a belt system may be used. Alternately, a gearing system may also be used.

The turbine blades may be a reverse flow "centrifugal fan rotor" type design and mounted on the discharge end of the flow tube assembly. This design can potentially exceed the Betz limit factor of 59.3% energy recovery of the available wind's air flow through the flow tube. The blades may be of a helical design, similar to air turbine vents as used on top of buildings, such that prevailing wind energy is imparted to the wind turbine in a multi-staged effect from both the inside and the outside of the wind turbine assembly. The "reverse flow fan design" means that the air flows from the inside smaller diameter of the fan rotor blades to the outside larger diameter of the fan rotor blades. The design may be of a backward curved blade design, counter to the direction of rotation of the fan rotor assembly, so that the force of the air flow against the blades is on the reverse side of the blades. This causes the generator to rotate in a direction counter to the discharge of the air flow discharging from the outer diameter of the reverse fan type air turbine rotor.

Assuming a constant 28 mph prevailing wind speed, a suitable design for the flow tube internal diameter is approximately 10 feet in diameter, which will provide sufficient air flow to the turbine rotor to generate approximately 3,000 to 6,000 watts of useful power. The amount of useful power depends on the overall efficiency of the specific wind turbine, the turbine blade design and the type of electrical power system utilized for any specific application.

A low pressure loss protective screen made of the same heavy duty hurricane fence type construction used for the floor of the T-rail and support cage assembly can also be provided at the inlet to the flow tube or the air scoop, where necessary, to protect operating personnel, flying birds, etc. from being drawn into the turbine blades.

The cross sectional area ratio of the air scoop perpendicular to the prevailing wind and the turbine blade inlet section or flow tube section should be at least 1:1; and it could practicably be up to 6:1 depending upon the available wind energy. There is no maximum ratio, only a ratio that is practical and economical for each application and intended purpose. The air scoop could be adjustable in size, perhaps utilizing an auto sail rigging system, to vary the air scoop to flow tube cross sectional area ratio based on the available wind velocity.

The present invention, which consists of the air scoop, the flow tube, integrated air turbine assembly section, air outlet section, and exit blocking curtain may be a variety of cylindrical and rectangular shapes. The materials of construction can be metal, wood, plastic (especially fiberglass), or fabric (i.e. sails, scoops, or curtains) of either a clear, transparent or opaque construction as is best suited for the environment where the present invention is to be installed. Various stiffening structures for rigidity may be employed, where appropriate or required.

The security fencing system, previously mentioned, may be employed to surround, yet be an integral part of the power generating structure that is in compliance with any required code or regulation for public safety. The fence will protect the public from rotating parts and electrical components. A security fence has other known benefits. It is important, however, that the fence type enclosure structure does not hinder the air flow into the present invention in any significant way.

The present invention has a more pleasing, aesthetic appearance as it conceals the turbine rotating generating parts from public view. As contrasted to conventional, high visibility wind turbines mounted on towers, the present invention provides a more fixed geometry which has more of an appearance of a building with an air scoop or sail mounted on top and facing the wind rather than a mechanical windmill and support tower fluttering in the wind. In visibly sensitive areas, such as inside city limits or within visible sight from public transportation areas, the present invention clearly provides less eye disturbance.

The preferred embodiment shown in FIGS. 1A-1B does not have to be installed at the ground level. It is possible, and desirable, to install the invention on top of a building structure, such as a tall office building. If the structure is installed on the side of a hill, the orientation of the air scoop may need to be rotated about an axis that is not vertical, but is at a suitable angle relative to the ground orientation.

The arrangement shown in FIGS. 1A-1B is a preferred embodiment. As an alternative, the air scoop could be located below the vertical axis turbine and the exit curtain located above it.

For easy installation in a variety of locations, the flow tube and circular rotating t-rail and support cage assembly may be shipped in two or more segments to facilitate transportation requirements and assembled in the field.

Figure 2A:
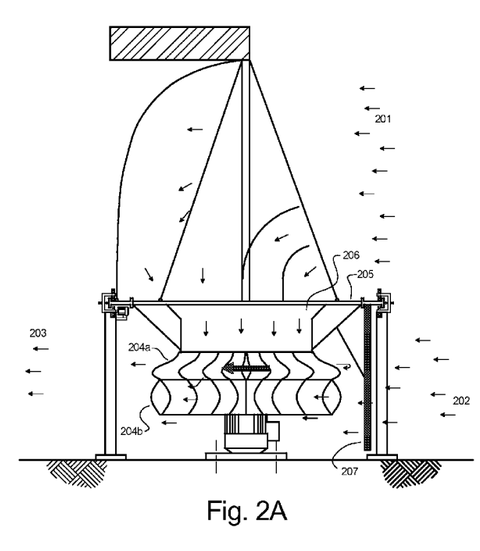
FIGS. 2A-2H shows additional preferred embodiments of the system which include lower section enhancements to utilize the lower portion of the prevailing wind.
Figure 2B:
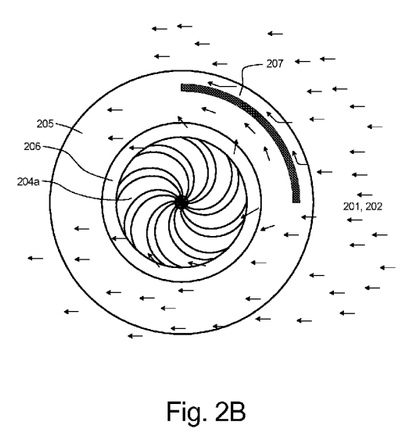

FIGS. 2A-2B show another embodiment of the power generating system. Again, a large air scoop made from a flexible material is raised above a vertical axis power generating turbine as already explained for FIGS. 1A-1B. An upper prevailing wind 201 and lower prevailing wind 202 are used to generate electricity through power generating turbine blades 204a, 204b and exhaust the air into the downstream wind 203. However, in this embodiment, the upper turbine blade section 204a is connected to a lower turbine blade section 204b that is specifically designed to utilize the lower prevailing wind 202 to provide additional rotating force for power generation. Equally, the two blade sections could be designed to be integrated into one overall turbine blade section to obtain any desired performance requirement. FIG. 2B is an abbreviated top view which shows only the circular rotating t-rail and support cage assembly 205, the flow tube 206, the upper turbine blades 204a, and the top of the exit drag curtain 207. As shown, the exit drag curtain 207 has been reduced to provide only a 90° coverage and allow the lower prevailing wind 202 to become partially concentrated and to pass over the lower turbine blade section or sections 204b on the down-spin side. In this view, the turbine blade rotation is clockwise.

Figure 2C:
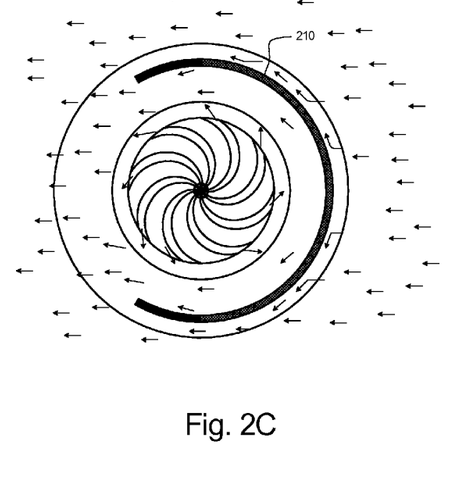
Figure 2D:
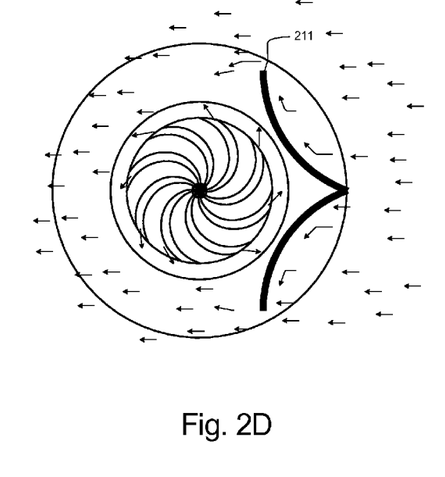
Figure 2E:
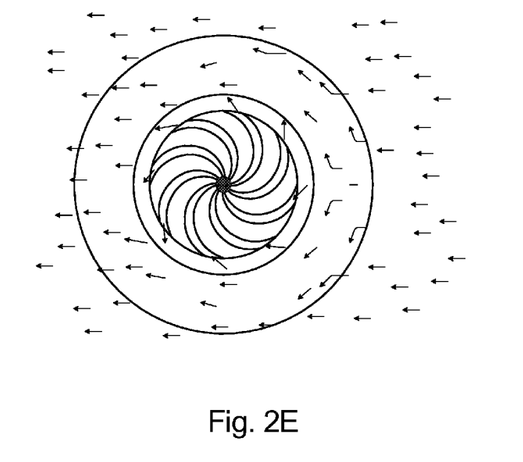
Figure 2F:
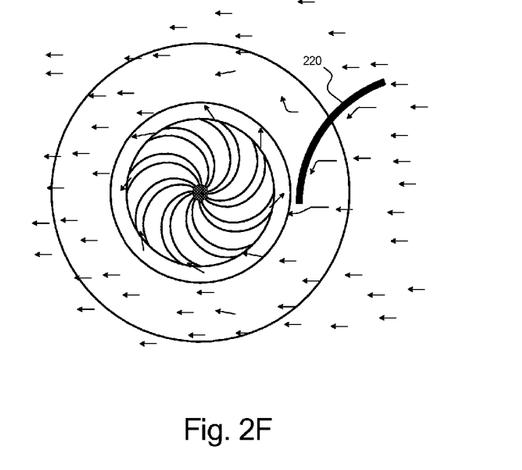

Similarly to FIG. 2B, FIG. 2C shows an exit drag curtain 210 that wraps the exit space from the turbine air exhaust with more than a 180° arc. FIG. 2D shows another exit drag curtain 211 geometry with potential use in some applications. FIG. 2E shows the projected air flow pattern if no exit drag curtain is used, and the air turbine blades are designed to utilize the lower prevailing wind in addition to the air provided by the air scoop. FIG. 2F shows another possible exit drag curtain 220 geometry.

Figure 2G:
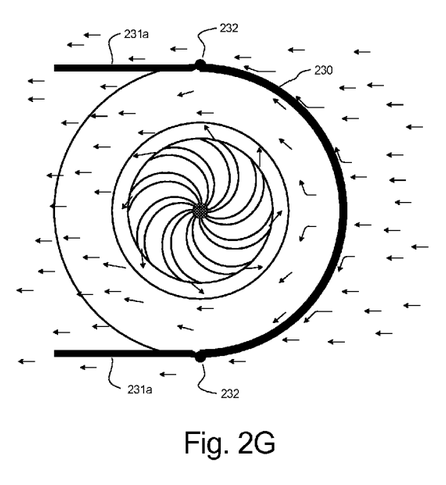
Figure 2H:
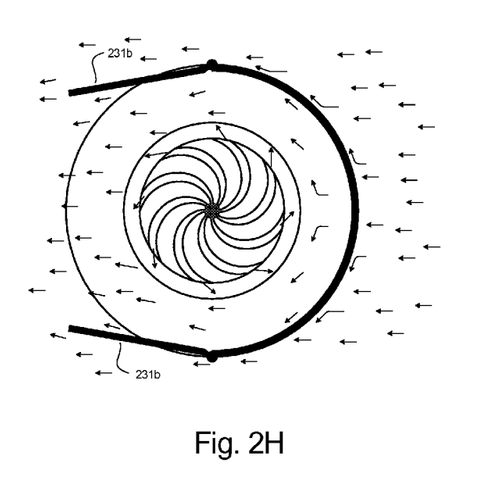

Similarly, FIGS. 2G and 2H show another embodiment of the exit drag curtain in plan view 230, 231a which has a variable geometry to change the exit drag curtain's drag coefficient. A curved, fixed portion 230 is attached to two straight portions that are parallel to each other 231a and connected by hinges 232. FIG. 2H shows the straight portions 231b which have been slightly directed inward from the parallel position, toward the center of the exit space on each side. An angle of 10° inward from the parallel position, as illustrated, may be advantageous in some wind conditions. The angle could also be varied by mechanical means to as much as 90° outward from the parallel position on each side to accomplish a "bluff body," also referred to as a flat plate or collar, type drag effect of the drag curtain according to the prevailing wind velocity.

Figure 3A:
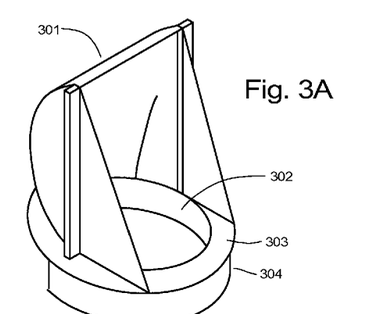
FIGS. 3A-3H illustrate several air scoop geometry shapes and lower exit drag curtain arrangements as mounted on a rotating circular t-rail and support cage assembly.

FIGS. 3A-3D show alternate arrangements of the air scoop and exit drag curtain. FIG. 3A shows the air scoop as outlined in the embodiment shown in FIGS. 1A-1B, except the flexible air scoop 301 lower edge matches the opening of the flow tube 302. The exit drag curtain 304 covers a 210° arc around the power generating area with enhanced power generating effect and, as previously illustrated, is attached to the circular rotating t-rail and support cage assembly 303.

Figure 3B:
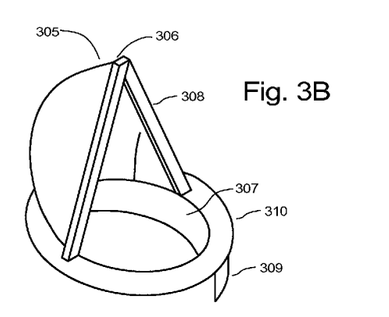

FIG. 3B shows an embodiment where the flexible air scoop 305 terminates at substantially a single point 306 above the flow tube opening 307 and utilizes an A-Frame mast 308. The lower exit drag curtain 309 only covers a 90° arc around the power generating area under the rotating circular t-rail and support cage assembly 310.

Figure 3C:
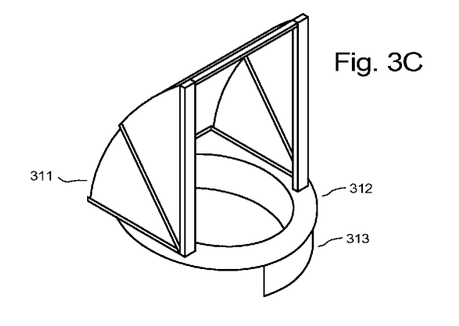

FIG. 3C shows an embodiment where the air scoop is a multiple hinged awning 311 that may be raised to a suitable height on the circular rotating t-rail and support cage assembly 312. The lower exit drag curtain 313 covers a 120° arc around the power generating area. The flexible air scoop illustrated in FIG. 3C does not have to be made from a flexible material. Rigid material could also be used to create the air scoop and still provide the variance in shape and size needed for optimal power generation. There could also be more than the two multiple awning sections 311 illustrated and they may all be a different shape.

Figure 3D:
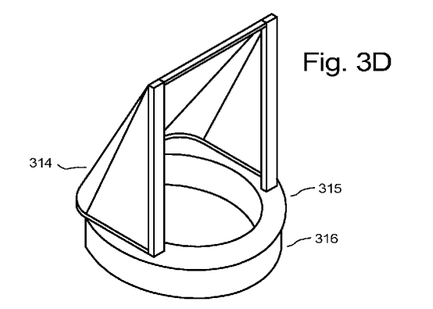

In FIG. 3D the flexible air scoop 314 is substantially triangular in style and mounted on the rotating circular t-rail and support cage assembly 315. The lower exit drag curtain 316 is wrapped in approximately a 270° arc, and is aerodynamically formed around the power generating area with the intent being to create a maximum vacuum type effect at the outlet of the air turbine to enhance the output power capability.

Figure 3E:
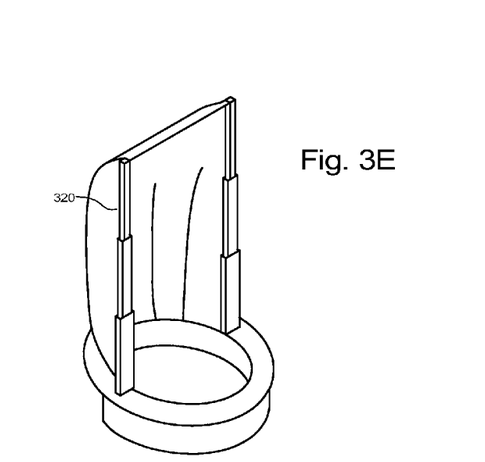
Figure 3F:
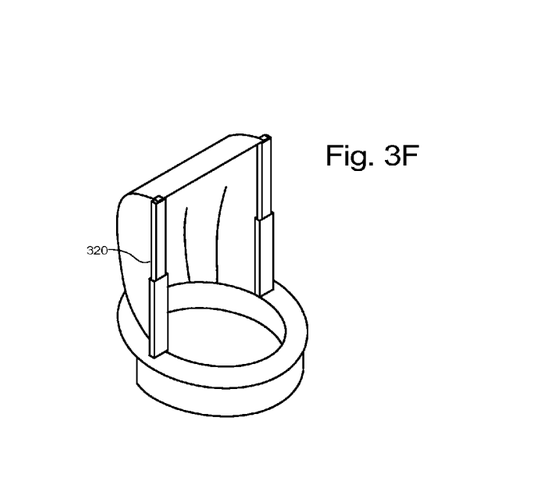
Figure 3G:
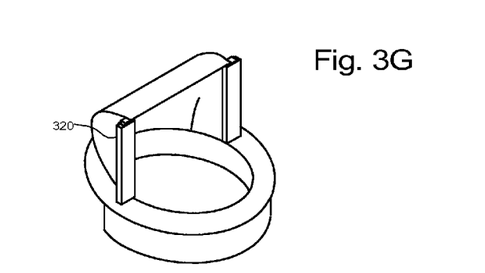

In FIG. 3E, the flexible air scoop is supported by two telescoping masts 320 of adjustable height. The air scoop is configured for collecting wind when the prevailing wind speed is low or more turbulent. In FIG. 3F, the same flexible air scoop is reduced in size by partially lowering the telescoping masts. The air scoop is then configured for collecting wind when the prevailing wind speed is moderate. In FIG. 3G the same flexible air scoop is reduced to a minimum size by completely lowering the telescoping portions of the masts. The air scoop is then configured to collect wind when the prevailing wind speed is very high.

Figure 3H:
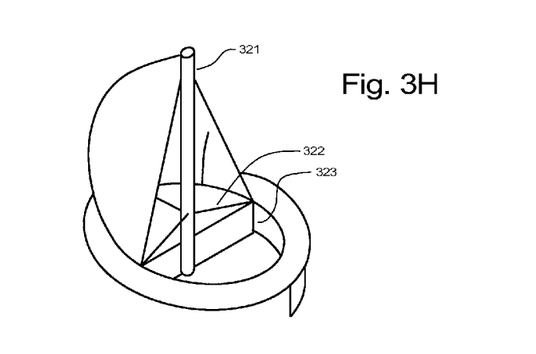

FIG. 3H shows an embodiment where the flexible air scoop is supported by a central vertical mast 321 which is, in turn, supported by gussets 323 and/or guy wires 322. In this case, the rigging may be similar to sailboat rigging, and used to raise and lower the flexible air scoop.

Figure 4A:
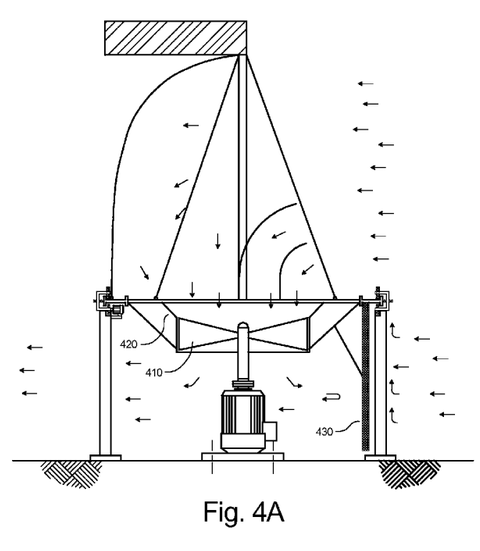
FIGS. 4A-4B show an embodiment where the turbine blades are located within an air flow tube.
Figure 4B:
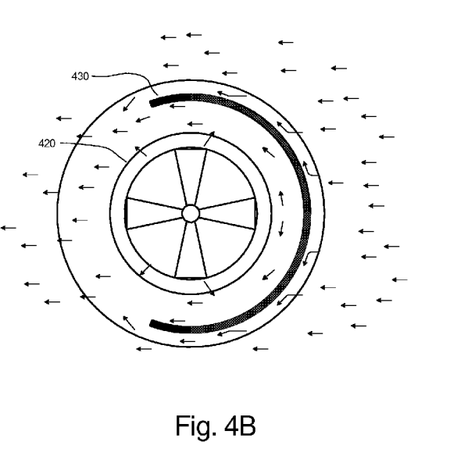

In FIGS. 4A-4B, a cross section of the present invention, similar to FIGS. 2A and 2B is shown where a propeller 410 is located within the flow tube 420. This simplified design is a lower capital cost, but provides lower efficiency and capacity. FIG. 4B shows the exit drag curtain 430 with 208° arc coverage. This arc coverage is a preferred embodiment and provides an optimum design in some situations.

Optionally, the exit drag curtain may be fixed to the direction of the prevailing wind, and may be varied in size rather than rotated with the air scoop. For example, the exit drag curtain may be in segments that are each open and closed through a mechanical means to provide a similar end result to rotating a fixed geometry curtain with the air scoop.

The exit drag curtain, or exit barrier, as described in the present invention, is designed to utilize the air drag effect created by the upstream air flow around the exit drag curtain. The average or bulk velocity of the exit air, after being exhausted from the air turbine through the exit air space, is lower than the average prevailing wind velocity. The entrainment between the two air streams can thus be designed to occur in an efficient manner by an appropriate exit drag curtain design which incorporates the air drag effect.

One distinct advantage of the present invention is the ability to regulate the amount of air that is brought through the turbine air blades, and to regulate the power output. It is desirable to maintain power production in a high speed wind by reducing the size of the air scoop. The amount of air throughput can easily be reduced with or without the air turbine system being in operation to prevent over-speeding the turbine blades. It is also desirable to design the size of the air scoop to match a particular location. For example, if there is a lower amount of average wind, the air scoop size may be enlarged. In this way, an optimization may be more readily found in a variety of locations utilizing a more standardized turbine design.

The power generated from the prevailing wind energy may be employed in creating compressed air, hydraulic pressure, pumping water, or reciprocating motion. It is not a requirement that the system is employed to generate electricity. However, electrical generation is a preferred embodiment.

The present invention may be adapted to smaller operations that utilize wind energy for the creation of needed power. For example, the teachings of the present invention may utilize existing structures as an air scoop and direct the air flow through a vertical axis turbine. A sailboat, for example, may use the wind pressure on the sail and direct a small portion of the air captured by the sail through a vertical axis turbine. The inlet section would be an inlet duct on the upwind side of a sail, and the outlet would be ducted to the down wind side of the same or other sails on the vessel. The inlet section, outlet section, and associated ductwork could be of a fixed or flexible design, and could then be routed to some convenient location where the turbine would be located. This same air flow could also be used to ventilate below deck quarters within the sailing vessel in series with the air turbine system through a suitable duct type system. This same concept could also be utilized on a non-powered barge type vessel. The power generating system could be used to charge batteries for general sailboat or barge power, or to power a small auxiliary electric outboard motor.

A prevailing wind exit drag curtain to protect the air exhaust space from the turbine is not necessarily a requirement of the present invention. However, it provides an important improvement in operational efficiency and enhanced capacity. In some cases, operational efficiency and enhanced capacity is not a paramount concern, such as needed in a remote area where the power need is infrequent.

Figure 5A:
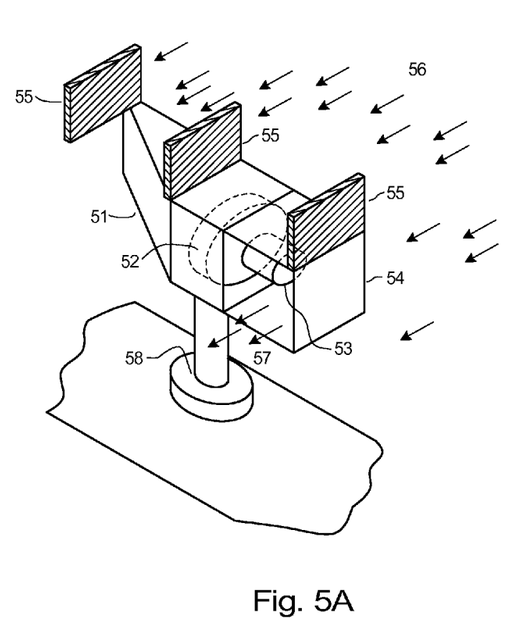
FIGS. 5A-5B shows how the present invention may be adapted to use as a horizontal axis turbine incorporating important features for the air scoop and exit drag curtain.

FIG. 5A shows another embodiment of the present invention and is preferred in some situations. A rigid air scoop 51 directs air from the prevailing wind 56 horizontally through air blades 52 which drive a power generator 53. An exit blocking shield 54, similar to the inlet air scoop in design, but rotated approximately 180 degrees from the direction of the prevailing wind, protects the turbine air exit space and allows the exit air 57 from the turbine to reenter the prevailing wind in an optimal manner. Stabilizing or directional air vanes 55 cause the entire structure to rotate on a rotating base 58 based on the prevailing wind direction, and to keep the air scoop 51 facing the prevailing wind. Alternatively, a Fechheimer type—highly directionally sensitive—velocity sensing probe could be used to help optimize the position of the air scoop and drag curtain via an air scoop jogging motor relative to the prevailing wind. This structure may be useful for smaller power generating systems.

Figure 5B:
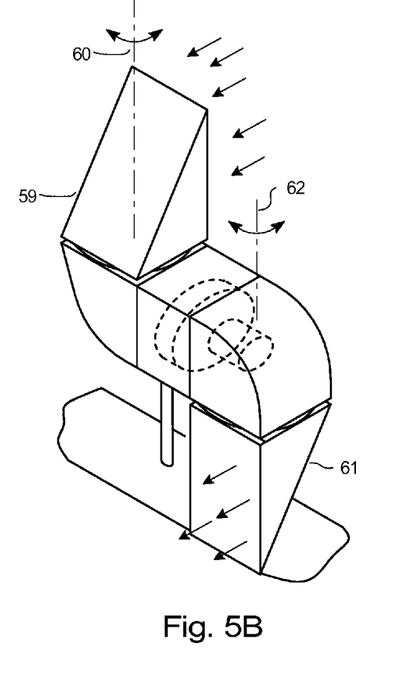

Similarly, FIG. 5B shows another embodiment where the air scoop 59 is oriented vertically and allows rotation about the vertical axis 60 as illustrated. The air scoop can easily be directed to face the prevailing wind. The exit drag curtain arrangement 61 consists of a second air scoop type structure which also rotates about a vertical axis 62, but always discharges in the downwind direction of the prevailing wind. Other wind blocking arrangements, such as illustrated in previous figures, could also be employed.

The air turbine does not necessarily need to be of a vertical axis-down-flow design to work cost effectively and efficiently. However, the air scoop section should always face into the wind, and the outlet drag section should most desirably face away from the prevailing wind in a multi-staged wind energy effect for optimum wind turbine system effectiveness and power capacity.

Data from a test rig where a prevailing wind was captured by a combined air scoop and exit drag curtain system designed according to the teachings of this invention, directed downward from the inlet air scoop into a vertical duct, turned 90° into a horizontal duct where the air velocity was measured, and then turned 90° downward and allowed to exit perpendicular to the prevailing wind direction into a fixed exit drag curtain configuration was employed, and which discharged in the downwind direction. Air velocity measurements were made using a rotary vane type wind meter and a hot wire anemometer of the prevailing wind and the air in the hosizontal duct respectively:

| Prevailing Wind Velocity (fpm) | Horizontal Air Duct Flow Velocity (fpm) |
|---|---|
| 411 | 641 |
| 521 | 652 |
| 554 | 563 |
| 810 | 837 |
| 818 | 906 |
| 623 Avg. | 720 Avg. |
| Increase | 16% |

Great care was taken to ensure that both meters were reading comparable wind velocities when placed side by side during the hot wire anemometer to wind meter calibration exercise and just prior to inserting the hot wire anemometer into the horizontal flow tube. Higher wind-to-air velocity differential readings were discarded due to non-uniform wind speeds or gusts prevalent at the time these readings were taken.

Surprisingly, the measurements show that the air velocity could be consistently increased to above the velocity of the prevailing wind when directed to the horizontal duct, demonstrating that there was no significant loss of wind energy. One readily concludes that there is no significant loss of available energy in the duct air flow, when compared to the available energy in the prevailing wind. One also concludes that the combined air scoop and downstream exit drag curtain system is highly effective in capturing the available wind energy. The credibility of this experimental evidence was also verified by flow computational methods, which are known in the art.

The exit drag curtains provide concentration of the energy available from the lower prevailing wind upstream of the air turbine assembly. They also enhance the available pressure drop across the air turbine blades. This is done by the inherent vacuum creation effect of the lower prevailing wind's velocity around the exit space from the turbine. This vacuum effect can be optimized by utilization of the wind concentration effects around the exit drag curtain relative to the lower velocities present at the inside of the exit drag curtain. The design will consider the specific geometries employed in the outlet section air entrainment mixture angles, located downstream of the exit drag curtain. For example, when more than a 180° exit drag curtain arc is used, the optimum mixture angle might easily be at a 15° straight converging included angle, or, as much as a 60° straight diverging included angle. Even a "bluff body" diverging angle of up to 180° may be considered. Extensive physical and math modeling may be required for each application considered to determine the optimal re-entrainment angles for most effective re-mixing of the two re-combining air streams back into the prevailing wind.

The basic principle of the preferred embodiment shown in FIGS. 1A-1B is based on the "S" type or reverse pitot tube for optimizing the velocity head differential achieved from a given air velocity. This type of probe is especially useful at lower air or gas velocities. For example, the pressure differential from an "S" type pitot tube in an air stream will be higher than a similar pitot tube measurement where the low pressure tube is oriented 90° to the air flow direction.

The structural, mechanical, instrumentation and control and electrical systems that safely and reliably convert the rotational energy output of the vertical air turbine to safe, useable power are well known in the available art and are not a part of this invention.

While various embodiments of the present invention have been described, the invention may be modified and adapted to wind turbines by those skilled in the art. Therefore, this invention is not limited to the description and figures shown herein, and includes all such embodiments, changes, and modifications that are encompassed by the scope of the claims.

I claim:

1. A vertical rotating axis wind power generating system comprising:
    a. a power generating turbine, wherein said power generating turbine incorporates air blades that rotate about an axis that is aligned to said vertical rotating axis,
    b. an air scoop that directs air from the prevailing wind through a flow tube toward said air blades, wherein said flow tube is substantially aligned to said vertical rotating axis,
    c. wherein said air scoop is rotatable about a second axis that is approximately vertical,
    d. wherein said air scoop is oriented to the prevailing wind direction and directs air from said prevailing wind into said air blades in a manner to produce power according to a predetermined criterion,
    e. wherein the size and shape of said air scoop is fixed or varied in a manner to produce power according to a predetermined criterion,
    f. wherein the exit air from said air blades flows into an exit space,
    g. wherein said exit space allows the exit air from said air blades to reenter the prevailing wind,
    h. wherein an exit barrier is used to shield at least part of said exit space from the prevailing wind,
    i. wherein said exit barrier and said exit space are designed to allow the entry of the exit air from said air blades back into said prevailing wind to efficiently produce power according to a predetermined criterion, and
    j. wherein the prevailing wind partially enters said exit space, and said air blades are additionally designed to create additional power from a portion of the prevailing wind that enters said exit space,
    whereby said power generating turbine creates useful power.

2. The vertical rotating axis wind power generating system according to claim 1 wherein said exit barrier is rotatable about a third axis, said third axis is substantially vertical, and the orientation of said exit barrier is coordinated with the orientation of said air scoop.

3. The vertical rotating axis wind power generating system according to claim 2 wherein said second axis and said third axis are both substantially aligned to said vertical rotating axis.

4. The vertical rotating axis wind power generating system according to claim 1 wherein the shape of said exit barrier, the size of said exit barrier, and the orientation of said exit barrier relative to the orientation of said air scoop are varied for the purpose of power production according to a predetermined criterion.

5. The vertical rotating axis wind power generating system according to claim 1 wherein said vertical rotating axis wind power generating system is located substantially at ground level.

6. The vertical rotating axis wind power generating system according to claim 1 wherein said vertical rotating axis wind power generating system is located on the top of a building.

7. The vertical rotating axis wind power generating system according to claim 1 wherein said vertical rotating axis wind power generating system is located on the top of a supporting durable framework.

8. The vertical rotating axis wind power generating system according to claim 1 wherein said air blades are reverse fan rotor blades located at either the inlet or outlet of a flow tube.

9. The vertical rotating axis wind power generating system according to claim 1 wherein said air scoop is oriented relative to the prevailing wind by use of stabilizing air vanes.

10. The vertical rotating axis wind power generating system according to claim 1 wherein said air scoop is oriented relative to the prevailing wind by use of auxiliary powered assistance in combination with a rotating support structure, and by use of a prevailing wind directional sensor.

11. The vertical rotating axis wind power generating system according to claim 1 wherein said useful power is electricity, pumping water, the creation of compressed air, or the creation of hydraulic pressure.

12. The vertical rotating axis wind power generating system according to claim 1 wherein the cross sectional area of said air scoop is at least the size of the maximum cross sectional air flow area through said flow tube, and the cross sectional area of said air scoop is measured perpendicular to the prevailing wind.

13. The vertical rotating axis wind power generating system according to claim 1 wherein said power generating turbine is installed on a sailboat, and at least one sail on said sailboat is used as said air scoop and also as said exit barrier.

14. The vertical rotating axis wind power generating system according to claim 1 wherein said air scoop directs air into said air blades by use of a flow tube.

15. The vertical rotating axis wind power generating system according to claim 14 wherein said air blades are located within said flow tube, wherein said air blades are a substantially conventional design, and wherein said conventional design is used in existing fans, existing propeller type turbines, or existing wind power generating designs.

16. The vertical rotating axis wind power generating system according to claim 1 wherein the exit air from said air blades leaves said exit space at an average velocity less than the average velocity of said prevailing wind.

17. The vertical rotating axis wind power generating system according to claim 1 wherein said air scoop is located above said air blades.

18. The vertical rotating axis wind power generating system according to claim 1 wherein said air scoop is located below said air blades.

19. A horizontal rotating axis wind power generating system comprising:
    a. a power generating turbine, wherein said power generating turbine incorporates air blades that rotate about an axis that is aligned to said horizontal rotating axis,
    b. an air scoop that is physically connected to a structure that directs air through a flow tube into said air blades, wherein said flow tube is substantially aligned to said horizontal rotating axis,
    c. wherein said air scoop is rotatable about a second axis that is approximately vertical, d. wherein said air scoop is oriented to the prevailing wind direction and directs air from said prevailing wind into said air blades in a manner to produce power according to a predetermined criterion,
e. wherein the size and shape of said air scoop is varied in a manner to produce power according to a predetermined criterion,
f. wherein the exit air from said air blades flows into an exit space,
g. wherein said exit space allows the exit air from said air blades to reenter the prevailing wind,
h. wherein an exit barrier is used to shield at least part of said exit space from the prevailing wind,
i. wherein said exit barrier and said exit space are designed to allow the entry of the exit air from said air blades back into said prevailing wind to efficiently produce power according to a predetermined criterion, and
j. wherein the prevailing wind partially enters said exit space, and said air blades are additionally designed to create additional power from a portion of the prevailing wind that enters said exit space, whereby said power generating turbine creates useful power.

* * * * *